(12) United States Patent
Olliges et al.

(10) Patent No.: US 12,532,875 B2
(45) Date of Patent: Jan. 27, 2026

(54) FISHING ROD HOLDER

(71) Applicant: Patrick Industries, Inc, Elkhart, IN (US)

(72) Inventors: Paul Olliges, Everett, WA (US); Paul Masato Furrer, Everett, WA (US)

(73) Assignee: Patrick Industries, Inc., Elkhart, IN (US)

( * ) Notice: Subject to any disclaimer, the term of this patent is extended or adjusted under 35 U.S.C. 154(b) by 11 days.

(21) Appl. No.: 17/862,203

(22) Filed: Jul. 11, 2022

(65) Prior Publication Data

US 2023/0009344 A1    Jan. 12, 2023

Related U.S. Application Data

(60) Provisional application No. 63/220,420, filed on Jul. 9, 2021.

(51) Int. Cl.
*A01K 97/10* (2006.01)
*A01K 97/06* (2006.01)

(52) U.S. Cl.
CPC ............. *A01K 97/10* (2013.01); *A01K 97/06* (2013.01)

(58) Field of Classification Search
CPC ................................ A01K 97/10; A01K 97/06
USPC ............. 43/21.2, 54.1; 206/315.11; 224/920, 224/922; 248/511, 512, 518, 520, 523, 248/524, 529, 534–536, 538, 539
See application file for complete search history.

(56) References Cited

U.S. PATENT DOCUMENTS

| | | | | |
|---|---|---|---|---|
| 545,385 A | * | 8/1895 | Simpson et al. ....... | A01K 97/10 248/513 |
| 1,352,663 A | * | 9/1920 | Charles .................. | A01K 97/10 248/533 |
| 2,160,499 A | * | 5/1939 | Goeb ..................... | A01K 97/10 43/22 |
| 2,249,302 A | * | 7/1941 | Smith .................... | A01K 97/10 43/21.2 |
| 2,576,212 A | * | 11/1951 | Carter ................... | A01K 97/10 248/516 |
| 2,576,624 A | * | 11/1951 | Miller ................... | A01K 97/10 248/514 |
| 2,658,650 A | * | 11/1953 | Jasper ................... | A01K 97/10 224/907 |
| 2,704,411 A | * | 3/1955 | Carroll ................. | A01K 97/125 43/17 |

(Continued)

FOREIGN PATENT DOCUMENTS

CN             212260217 U  *  1/2021
WO      WO-2020036880 A1 *  2/2020  ............ A01K 97/01

*Primary Examiner* — Darren W Ark
(74) *Attorney, Agent, or Firm* — Christensen O'Connor Johnson Kindness PLLC

(57) ABSTRACT

A fishing rod holder includes a tubular member having an elongate channel portion and a collar portion. The upper end of the channel portion has a U-shaped lip that extends rearwardly and a slot that engages the U-shaped lip. A collar portion extends over the elongate channel. A ramp extends from a bottom end of the elongate channel portion. The tubular member receives a handle end of the fishing rod such that the handle end engages and slides down the angled ramp until the fishing rod engages a bottom end of the collar portion. Another portion of the fishing rod engages the U-shaped lip and slot, providing a secure engagement with the fishing rod.

19 Claims, 6 Drawing Sheets

(56) References Cited

U.S. PATENT DOCUMENTS

| | | | | | |
|---|---|---|---|---|---|
| 2,724,569 | A | * | 11/1955 | Licata | A01K 97/10 403/53 |
| 2,954,909 | A | * | 10/1960 | Miller | A01K 97/10 224/907 |
| 3,021,101 | A | * | 2/1962 | Gliebe | A01K 97/10 24/3.9 |
| 3,543,432 | A | * | 12/1970 | Gates | A01K 97/10 43/21.2 |
| 4,017,998 | A | * | 4/1977 | Dumler | A01K 97/10 248/514 |
| 4,150,506 | A | * | 4/1979 | McGinnis | A01K 97/10 43/21.2 |
| 4,202,125 | A | * | 5/1980 | Kovacs | A01K 97/10 43/17 |
| 4,257,181 | A | * | 3/1981 | Cooper | A01K 97/10 248/530 |
| 4,375,731 | A | * | 3/1983 | Budd | A01K 97/10 43/21.2 |
| 4,551,939 | A | * | 11/1985 | Kitchens | A01K 97/10 248/513 |
| 4,803,794 | A | * | 2/1989 | Lopez | A01K 97/10 248/538 |
| 4,845,881 | A | * | 7/1989 | Ward | A01K 97/22 43/21.2 |
| 4,871,099 | A | * | 10/1989 | Bogar, Jr. | A01K 97/10 248/512 |
| 4,876,980 | A | * | 10/1989 | Bell, III | A01K 97/10 224/406 |
| 4,919,316 | A | * | 4/1990 | Grauberger | A01K 97/10 224/567 |
| 5,014,891 | A | * | 5/1991 | King | A01K 97/10 224/678 |
| 5,024,018 | A | * | 6/1991 | Ferrigno | A01K 97/10 224/672 |
| 5,044,109 | A | * | 9/1991 | Fast | A01K 97/10 224/678 |
| 5,052,146 | A | * | 10/1991 | Resnick | A01K 97/10 43/21.2 |
| 5,269,488 | A | * | 12/1993 | Lach | G09F 17/00 248/512 |
| 5,331,761 | A | * | 7/1994 | Kuthy | A01K 97/10 206/315.11 |
| 5,386,932 | A | * | 2/1995 | Gross | A01K 97/10 224/907 |
| 5,797,212 | A | * | 8/1998 | Kistner | A01K 97/10 224/922 |
| 5,813,162 | A | * | 9/1998 | Tse | A01K 97/10 224/242 |
| 5,845,891 | A | * | 12/1998 | West | A01K 97/10 248/538 |
| 5,937,567 | A | * | 8/1999 | Elkins | A01K 97/10 248/538 |
| 6,003,746 | A | * | 12/1999 | Richardson | A01K 97/10 224/678 |
| 6,029,872 | A | * | 2/2000 | Ellington | A01K 97/10 224/678 |
| 6,089,524 | A | * | 7/2000 | Lai | A01K 97/10 248/538 |
| 6,112,449 | A | * | 9/2000 | Blackwell | A01K 97/10 248/538 |
| 6,263,608 | B1 | * | 7/2001 | Ernst | A01K 97/10 248/530 |
| 6,497,067 | B1 | * | 12/2002 | King | A01K 97/10 248/538 |
| 7,140,507 | B2 | * | 11/2006 | Maldonado | A45C 11/20 220/592.2 |
| 7,389,608 | B1 | * | 6/2008 | MacKay | A01K 97/20 206/315.11 |
| 7,472,510 | B1 | * | 1/2009 | Fasola | A01K 97/08 43/21.2 |
| 7,621,066 | B1 | * | 11/2009 | Mathison | A01K 97/10 224/922 |
| 7,686,276 | B1 | * | 3/2010 | McCauley | A01K 97/10 248/538 |
| 7,740,220 | B2 | * | 6/2010 | Jeanveau | E04H 12/2269 248/534 |
| 7,753,441 | B1 | * | 7/2010 | Gray, Jr. | A01K 97/22 297/188.11 |
| 7,841,124 | B2 | * | 11/2010 | Wegman | A01K 97/10 43/21.2 |
| 8,291,636 | B2 | * | 10/2012 | Wilcox | A01K 97/10 114/364 |
| 8,375,622 | B1 | * | 2/2013 | Holzmann, Jr. | A01K 97/10 43/21.2 |
| 8,567,108 | B1 | * | 10/2013 | Babbs | A01K 97/11 43/21.2 |
| 8,640,377 | B2 | * | 2/2014 | Baltes | A01K 97/10 224/406 |
| 8,800,197 | B2 | * | 8/2014 | Wilcox | A01K 97/10 114/364 |
| 9,307,838 | B1 | * | 4/2016 | Blavat | A47B 81/005 |
| 9,314,008 | B2 | * | 4/2016 | DeSpiegelaere | A01K 97/06 |
| 9,913,464 | B1 | * | 3/2018 | Stokes | F16M 13/02 |
| 10,668,863 | B2 | * | 6/2020 | Ferreri | B62B 9/147 |
| D917,659 | S | * | 4/2021 | Pratt | D22/147 |
| 11,259,514 | B1 | * | 3/2022 | Larsson | A01K 97/10 |
| 11,324,208 | B1 | * | 5/2022 | Lee | A01K 97/10 |
| 11,399,527 | B2 | * | 8/2022 | Erdmann | A45F 3/04 |
| 12,227,331 | B1 | * | 2/2025 | Cifers, III | B65D 11/1873 |
| 2002/0179804 | A1 | * | 12/2002 | Graves | E01F 9/669 102/343 |
| 2003/0168573 | A1 | * | 9/2003 | Luo | G09F 17/00 248/512 |
| 2004/0237378 | A1 | * | 12/2004 | Fraser | A01K 97/22 43/54.1 |
| 2005/0173610 | A1 | * | 8/2005 | Peters | A01K 97/10 248/538 |
| 2007/0039230 | A1 | * | 2/2007 | Burnley | A01K 97/10 43/21.2 |
| 2008/0295383 | A1 | * | 12/2008 | Wakefield | A01K 97/10 43/21.2 |
| 2010/0018104 | A1 | * | 1/2010 | Pedersen | A01K 97/10 224/675 |
| 2010/0071250 | A1 | * | 3/2010 | Morehead | A01K 97/10 43/21.2 |
| 2011/0099883 | A1 | * | 5/2011 | Baltes | A01K 97/10 114/364 |
| 2012/0110889 | A1 | * | 5/2012 | DeSpiegelaere | A01K 97/08 29/428 |
| 2013/0227875 | A1 | * | 9/2013 | DeSpiegelaere | A01K 97/08 43/54.1 |
| 2014/0115947 | A1 | * | 5/2014 | Wilcox | A01K 97/10 43/21.2 |
| 2014/0331543 | A1 | * | 11/2014 | Hancock | A01K 97/01 43/17 |
| 2014/0360086 | A1 | * | 12/2014 | Finlan | A01K 97/10 43/21.2 |
| 2015/0230447 | A1 | * | 8/2015 | Keossian | A01K 97/10 43/17 |
| 2015/0257376 | A1 | * | 9/2015 | Camp, Jr. | A01K 97/06 43/55 |
| 2016/0045024 | A1 | * | 2/2016 | Roberts | A47B 81/005 248/512 |
| 2018/0125050 | A1 | * | 5/2018 | Smith | A45F 3/44 |
| 2019/0098885 | A1 | * | 4/2019 | Sarnowski | A01K 97/10 |
| 2020/0187477 | A1 | * | 6/2020 | Clark, Jr. | A01K 97/10 |
| 2021/0345588 | A1 | * | 11/2021 | Leach | A01K 97/20 |
| 2022/0055707 | A1 | * | 2/2022 | Megica, Jr. | B62J 11/05 |
| 2022/0295773 | A1 | * | 9/2022 | Taylor | B60R 7/08 |
| 2022/0378031 | A1 | * | 12/2022 | Hayes | A01K 97/10 |

* cited by examiner

FISHING ROD HOLDER

CROSS-REFERENCE TO RELATED APPLICATION

This application claims the benefit of Provisional Application No. 63/220,420, filed Jul. 9, 2021, the disclosure of which is hereby incorporated by reference herein.

BACKGROUND

Fishing rod holders for temporarily retaining one or more fishing rods are known in the art. Prior art fishing rod holders may typically be permanently or temporarily installed on watercraft or on fixed structures, such as piers or the like at fishing sites. For example, U.S. Pat. Appl. Publ. No. 2022/0055707, to Megica, Jr., which is hereby incorporated by reference, discloses a fishing rod holder for transporting a fishing rod on a bicycle. In some applications, fishing rod holders may temporarily support a deployed fishing rod while trolling for a strike and/or while the user is engaged in other activities. As noted in U.S. Pat. No. 11,324,208, to Lee, which is hereby incorporated by reference, traditional fishing rod holders "are simplistic in design, typically include a hollow cylinder with two open ends, and at times including a slot to receive the reel of a fishing rod."

Some prior art fishing rod holders, for example, the fishing rod holder disclosed in U.S. Pat. No. 8,291,636, to Wilcox et al., which is hereby incorporated by reference, include one or more tubular members. The fishing rod holder disclosed in Wilcox does not accommodate protruding reels and does not disclose any means for securing the fishing rod in the holder. It also may be challenging to insert and remove a fishing rod disposed in the holder disclosed in Wilcox, which requires the user to orient the butt end of the fish rod substantially aligned with the axis of the holder while inserting or removing the fishing rod. U.S. Pat. No. 11,259,514, to Larsson et al., which is hereby incorporated by reference, discloses a fishing rod holder that includes illumination elements located at a bottom end of the fishing rod holder. U.S. Pat. D917,659, to Pratt, discloses a tandem fishing rod holder, having two tubular members connected by a central panel.

Prior art fish rod holders may pose a risk of losing the fishing rod, for example, on a moving watercraft or the like. To secure a retained fishing rod, a fishing rod holder may include a releasable strap, for example, located at an upper end of the fishing rod holder, for securing the fishing pole. A disadvantage of securement straps is that they requires a user to fasten the strap to secure the fishing rod, and to release the strap to remove the fishing pole, which may interfere with the fishing activities. Reliance on a releasable strap may result in loss of the fishing rod if the strap is not consistently and properly engaged.

U.S. Pat. No. 9,307,838, to Blavit, which is hereby incorporated by reference, discloses a fishing rod holder having a base, a rod holder pad, and a suction cup. Blavit discloses a pair of the disclosed rod holder mounted to a small watercraft with a distal portion (non-handle portion) of the fishing rod engaging both retainers for transporting the fishing rod. The rod holders may retain the fishing rod, even if the watercraft overturns. However, the assembly requires two holders to secure the fishing rod and may be difficult to secure and remove the fishing rod while boating.

It would be beneficial to provide a fishing rod holder that would aid in securely retaining the fishing rod disposed in the fishing rod holder, without requiring a user to reengage a retainer mechanism between uses, and that would not significantly impede a user from removing the fishing rod from the fishing rod holder. It would also be beneficial to provide a container for holding a plurality of fishing poles for easy access, and that is also suitable for receiving and retaining other items such as other fishing gear, personal items, caught fish, or the like.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A fishing rod holder is disclosed that is configured to be supported in an upright position to receive and retain a handle end of a fishing rod. The fishing rod holder includes a tubular member having an elongate channel portion having an upper end and a lower end, and a collar portion that extends over at least an intermediate part of the elongate channel portion to cooperatively define a tube. An angled ramp extends from a bottom end of the elongate channel, and the tubular member is configured to receive a handle end of the fishing rod such that the handle end slidably engages the angled ramp, and the slidable motion of the fishing rod causes the fishing rod to abut the fishing rod holder at three points.

In an embodiment an upper end of the elongate channel portion has a U-shaped lip that extends rearwardly, and an elongate slot that engages the U-shaped lip.

In an embodiment the angled ramp further comprises a peripheral rim.

In an embodiment the elongate channel portion has at least two mounting bosses extending from a back side of the tubular member, and a back end of the U-shaped lip is aligned with, or forward of, back ends of the at least two mounting bosses.

In an embodiment the collar portion defines a tapered slot that extends downwardly from a top end of the collar portion.

In an embodiment the angled ramp and rim portion cooperatively define a drain.

In an embodiment the retained fishing rod engages a lower end of the collar portion and extends through the elongate slot to engage the U-shaped lip. For example the fishing rod holder may be an integral portion of a first wall of a container, and the container has at least four walls and a bottom panel, wherein the four walls and the bottom panel are configured to be assembled to form a crate.

In an embodiment the fishing rod holder is a component of a crate assembly having a plurality of fishing rod holders, and the crate assembly includes a bottom panel, two end panels attachable to extend upwardly from the bottom panel, and two side panels attachable to extend upwardly from the bottom panel, each side panel being further attachable to each of the pair of end panels to form the crate assembly.

In an embodiment the at least one fishing rod holder of each side panel is integrally formed portion of the side panel. For example, each of the side panels include at least one fishing rod holder.

A fishing rod holder is configured to retain a fishing rod is disclosed. The fishing rod holder includes an elongate tube configured to receive a handle end of the fishing rod therethrough, the tube having an upper abutment surface on a first side of the tube, and a lower abutment surface on a second side of the tube opposite the first side. A ramp extends at a downward angle from the first side of the tube at a lower end of the tube such that the ramp extends directly under the tube, wherein the ramp is configured to slidably engage an end of the received fishing rod handle such that the weight of the fishing rod causes the handle end to slide down the ramp such that the fishing rod engages the upper abutment surface and lower abutment surface.

In an embodiment, the fishing rod holder is injection molded as a unitary piece.

In an embodiment the ramp further includes a peripheral rim.

In an embodiment the elongate channel portion includes at least two mounting bosses extending from a back side of the elongate tube.

In an embodiment an upper end of the elongate tube has a U-shaped lip that extends rearwardly, and an elongate slot that engages the U-shaped lip.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
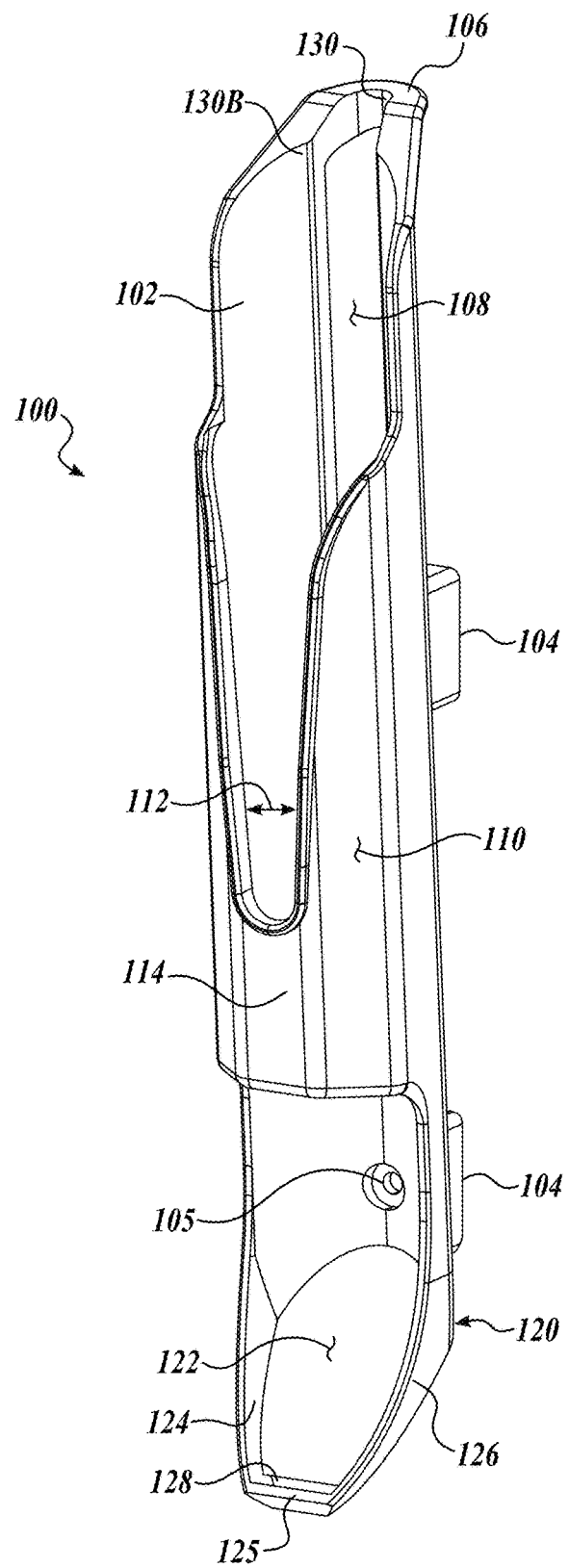
FIG. 1 is a perspective view of a first embodiment of a fishing rod holder in accordance with the present invention.
Figure 2:
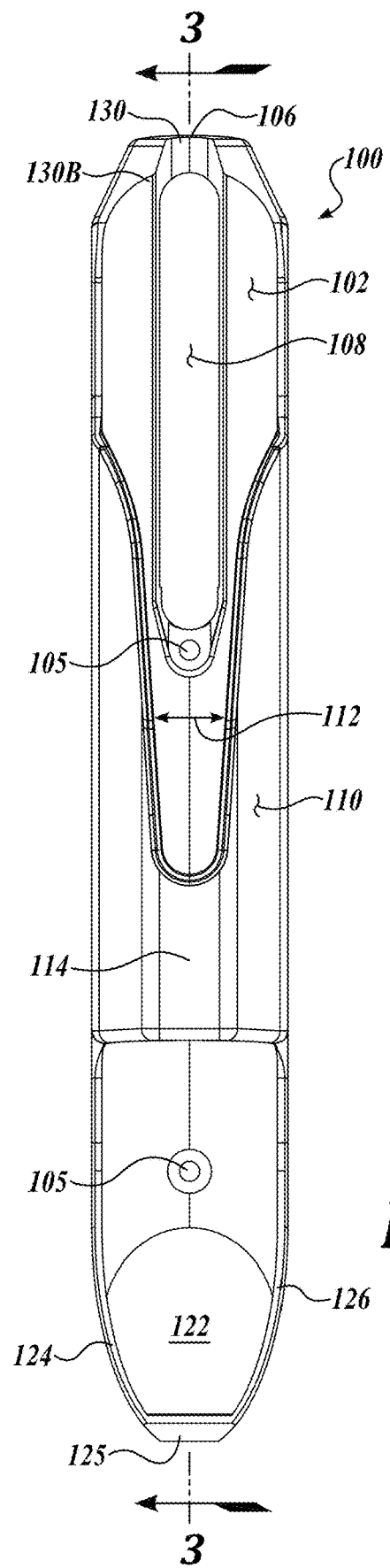
FIG. 2 is a front view of the fishing rod holder shown in FIG. 1.
Figure 3A:
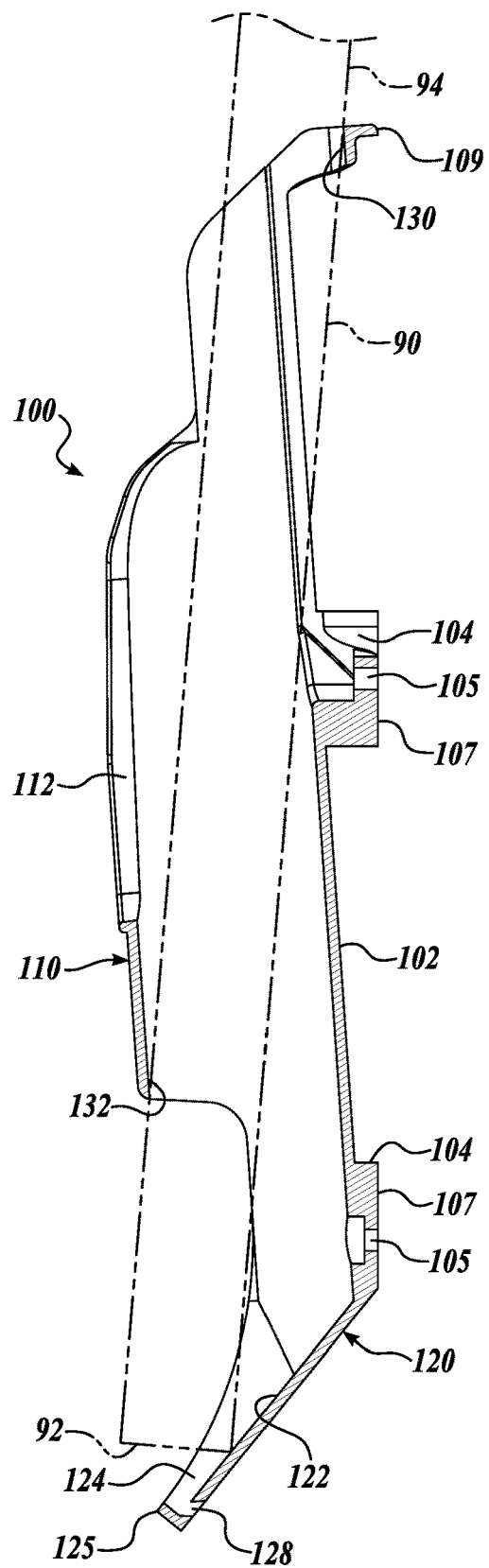
FIG. 3A is a sectional side view of the fishing rod holder through section 3-3 indicated in FIG. 2, with a portion of a retained fishing rod having a relatively small diameter handle shown in phantom line.
Figure 3B:
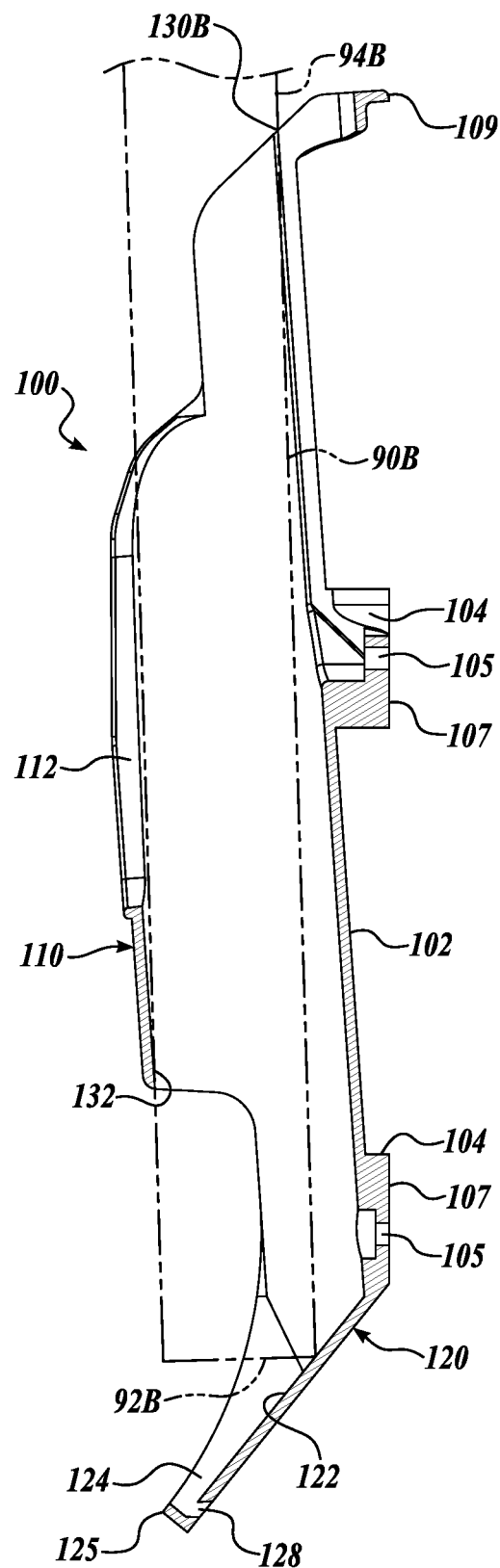
FIG. 3B is a sectional view of the fishing rod holder through section 3-3 indicated in FIG. 2, with a portion of a fishing rod having a relatively large diameter handle shown in phantom line.

A perspective view of a fishing rod holder 100 in accordance with the present invention is shown in FIG. 1, and FIG. 2 is a front view of the fishing rod holder 100. FIG. 3A is a sectional side view of the fishing rod holder 100 with a handle portion of a relatively narrow fishing rod 90 shown in phantom retained in the fishing rod holder 100, and FIG. 3B is a sectional side view of the fishing rod holder 100 with a handle portion of a relatively larger-diameter fishing rod 90B shown retained in the fishing rod holder.

The fishing rod holder 100 is a generally tubular member that may be mounted, for example, in an upright orientation and is configured to receive a handle end 92 of the fishing rod 90 (see FIG. 3A). Although the fishing rod holder 100 may conveniently be mounted in the vertical orientation shown in FIG. 1, it will be appreciated by persons of skill in the art that the fishing rod holder 100 may be mounted and used at an angle, for example, 10-20 degrees from a vertical orientation. The fishing rod holder 100 is configured to securely retain the fishing rod 90 without significantly impeding a user's ability to access and remove the fishing rod 90 from the fishing rod holder 100. In this embodiment the fishing rod holder 100 is configured to be attached to a support structure (not shown) in the upright orientation. The support structure may be any convenient surface, for example, a movable container, a wall or other vertical surface on a watercraft, a fishing dock piling, or the like.

The fishing rod holder 100 has an elongate channel portion 102 that is configured to receive the fishing rod 90 (see FIG. 3A). An upper end of the channel portion 102 defines a U-shaped lip portion 106 that extends rearwardly from a top of the channel portion 102, and is configured to engage with a portion of the fishing rod 90 retained in the holder 100. In this embodiment an optional elongate opening or slot 108 in an upper end of the channel portion 102 extends below the upper lip portion 106 and is sized to receive and accommodate a portion of the fishing rod 90 handle when the fishing rod 90 engages the U-shaped upper lip portion 106.

The channel portion 102 optionally includes a plurality of spaced-apart mounting bosses 104 (two shown) that extend from a back side of the channel portion 102 and are disposed below the slot 108. The mounting bosses 104 include through holes 105 configured to accommodate conventional mounting hardware (not shown). In this embodiment a back surface 109 of the upper lip portion 106 is aligned with, or is forward of, the back surfaces 107 of the two mounting bosses 104 such that the fishing rod holder 100 may be mounted to an upright planar surface (not shown) without interference with the upper lip portion 106.

The fishing rod holder 100 further includes a forward collar portion 110 that extends over at least a lower section of the channel portion 102 forming a generally tubular region that receives the fishing rod handle end 92. As seen most clearly in FIG. 1, the collar portion 110 in this embodiment defines an elongate, generally U-shaped opening 112 that is configured to accommodate a fishing reel (not shown) or other components mounted on the fishing rod 90. The U-shaped opening 112 is reinforced, e.g., the opening 112 includes a lip having a greater thickness or extends outwardly from the collar portion 110.

The fishing rod holder 100 further includes a ramp portion 120 extending from and underlying a bottom end of the channel portion 102. The ramp portion 120 may be co-formed with, or fixedly attached to, a lower end of the channel portion 102. The ramp portion 120 includes a fishing rod support surface, for example, an angled ramp plate 122 that slants downwardly from a back side of the channel portion 102. In the current embodiment the ramp portion 120 is a generally flat angled plate 122. In other embodiments the plate 122 may be curved and/or may be provided with transverse ridges, bumps, or other surface features. For example, in some embodiments the angled plate 122 may include a rubber or polymeric pad or coating (not shown).

Rim portions 124, 125, 126 extend upwardly around perimeter edges of the angled ramp plate 122. The rim portions 124, 125, 126 are configured to deter or prevent the handle end 92 of a fishing rod 90 from sliding too far along, or completely off of the angled plate 122. An optional drain slot 128 is located on a distal end of the angled plate 122 and facilitates water drainage from the fishing rod holder 100.

The channel portion 102, collar portion 110, ramp portion 120, and rim portions 124, 125, 126 may be co-formed as a unitary structure, for example by injection molding, or may be assembled from a plurality of components.

The fishing rod holder 100 is configured to use the weight of the fishing rod 90 to position and retain the fishing rod 90 in the fishing rod holder 100 in an angled position, such that the fishing rod 90 will generally have three-point contact with the fishing rod holder 100. Refer again to the sectional view of FIG. 3A a portion of a fishing rod 90 is shown in phantom, and is retained in the fishing rod holder 100. To use the fishing rod holder 100 the user simply inserts the fishing rod 90 handle-first into the fishing rod holder 100. As the handle end 92 of the fishing rod 90 engages the angled ramp plate 122 the weight of the fishing rod 90 causes the handle end 92 of the fishing rod 90 to slide downwardly along the angled ramp plate 122. As the fishing rod handle 92 moves downwardly and forwardly along the ramp plate 122 the fishing rod 90 engages a lower end 132 of the collar portion 110. The lower end of the collar portion 110 therefore provides a lower abutment surface 132 for the fishing rod 90. If a higher portion 94 of the fishing rod 90 does not engage the channel portion 102, for example the upper abutment surface 130, the fishing rod 90 will slide further down the angled ramp plate 122, and the lower abutment surface 132 will causes the fishing rod 90 to rotate (clockwise in FIG. 3A) until the intermediate portion 94 of the fishing rod 90 engages an upper end of the channel portion 102, for example an upper abutment surface 130 defined by the upper lip portion 106. The weight of the fishing rod 90 on the ramp plate 122, and the engagement with the abutment surfaces 130, 132 secures the fishing rod 90 in the fishing rod holder 100. The fishing rod 90 is therefore retained in a well-defined orientation with three-point contact (e.g., with the ramp 122, the lower abutment surface 132, and the upper abutment surface 130.

It is contemplated that another embodiments the channel portion does not include a U-shaped lip portion 106 or slot 108, such that the upper abutment surface is provided by an upper end of the channel portion.

The fishing rod holder 100 provides a secure and relatively easy to use system for retaining a fishing rod 90 in an upright orientation.

FIG. 3B shows the fishing rod holder 100 with a retained fishing rod 90B having a handle with a larger diameter. For example, the intermediate portion 94B may be larger than the lip portion 106. The handle end 92B of the fishing rod 90B contacts the ramp portion 120 at a higher location on the ramp plate 122, contacts the intermediate abutment surface 132 of the collar portion 110, and contacts an upper abutment surface 130B of the optional lip upper end of the channel portion 102. Therefore, the larger diameter fishing rod 90B also has a secure three-point contact with the fishing rod holder 100, to securely retain the fishing rod 90B.

Figure 4:
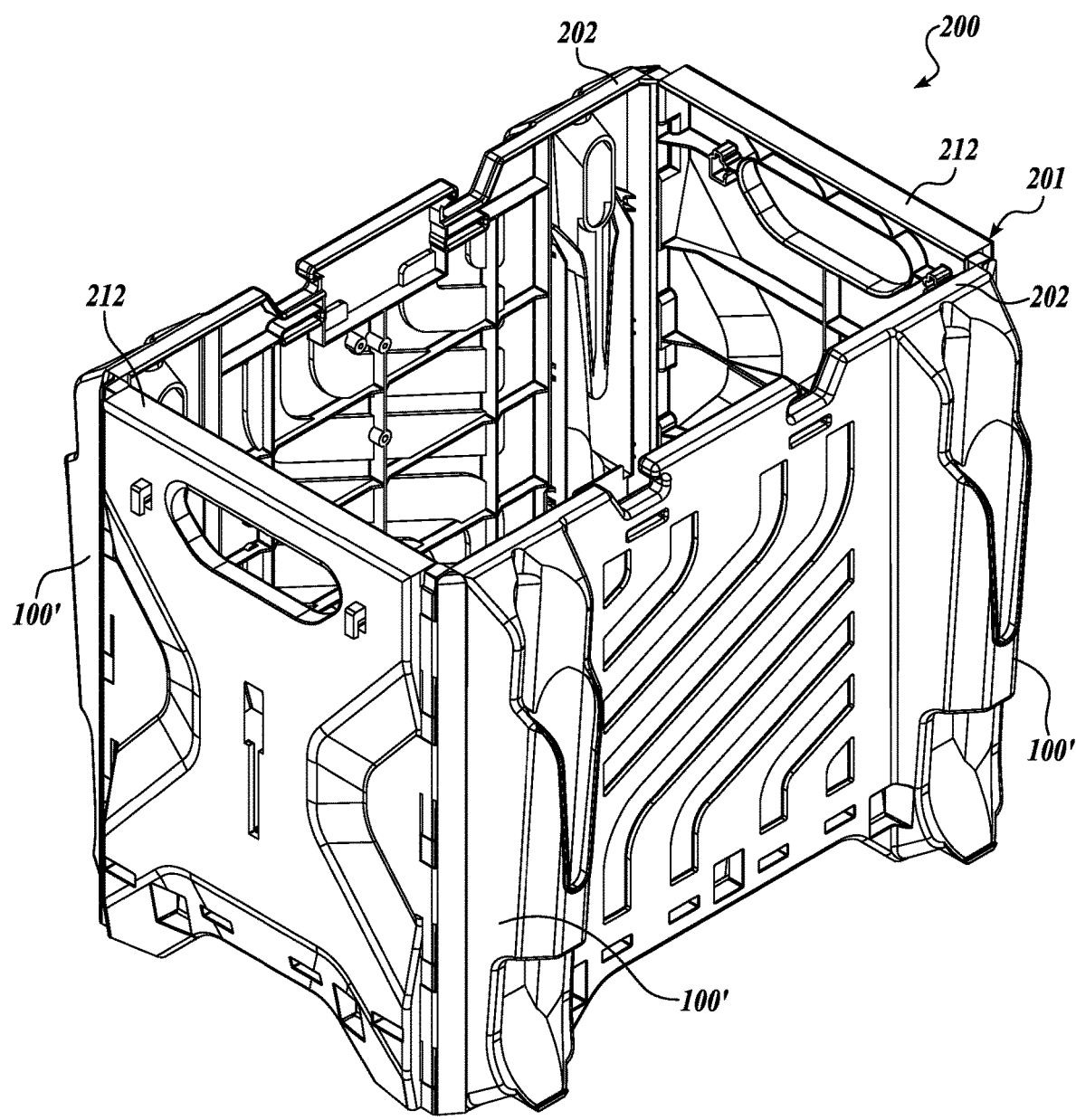
FIG. 4 is a perspective view of a second embodiment of a fishing rod holder in accordance with the present invention having four fishing rod holders that are similar to the fishing rod holder shown in FIG. 1, and are integrated portions of a container or crate.
Figure 5:
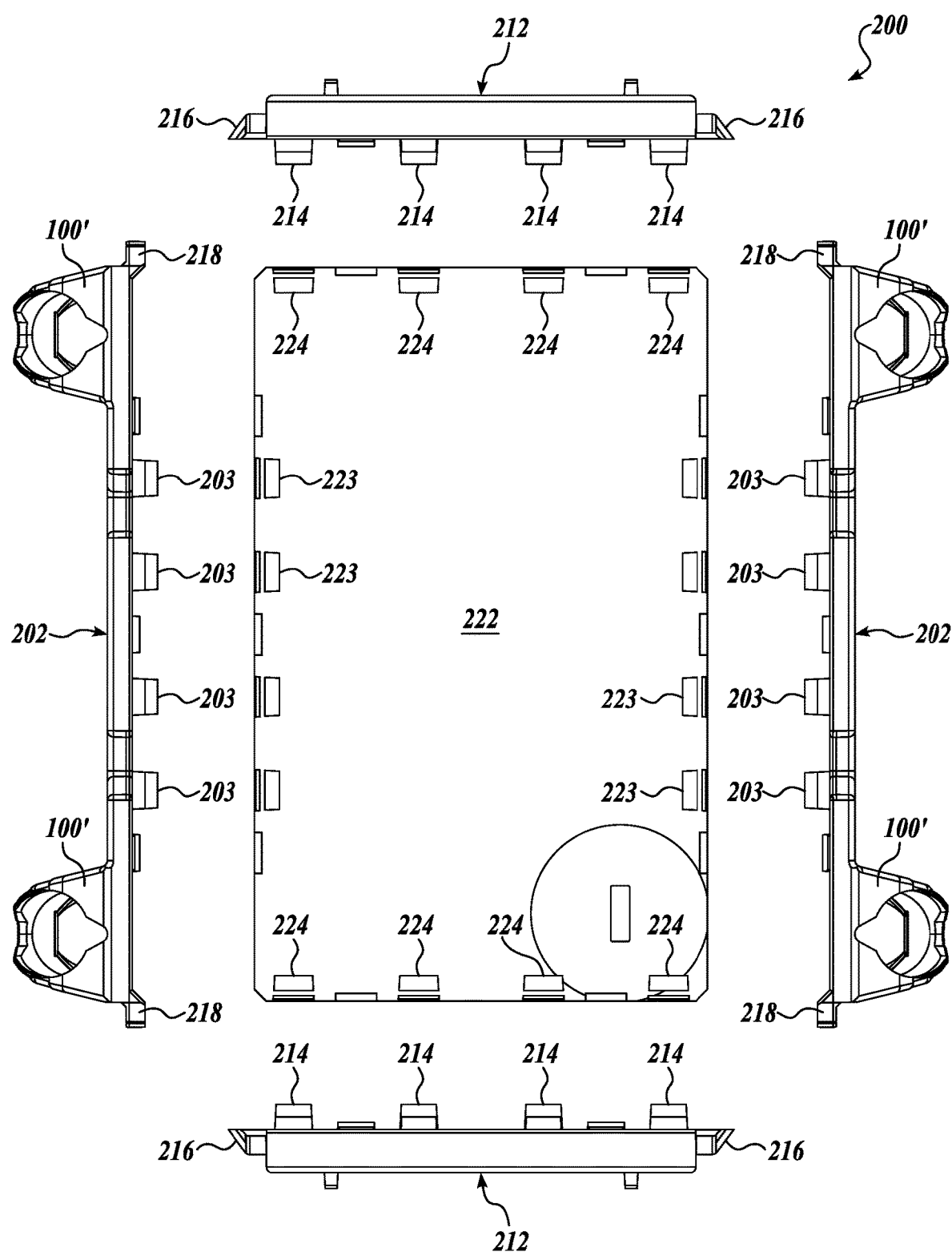
FIG. 5 is an exploded plan view of the fishing rod holder shown in FIG. 4.

FIGS. 4 and 5 show an embodiment of a fishing rod holder assembly 200 configured to accommodate a plurality of fishing rods 90. The fishing rod holder assembly 200 includes a container or crate 201 having a plurality of peripheral fishing rod holders 100' (four shown) located on outer sidewalls of the crate 201. The fishing rod holders 100' are similar to the fishing rod holder 100 shown in FIGS. 1-3B, and details of the fishing rod holders 100' are not repeated. The fishing rod holders 100' are each generally similar to the fishing rod holders 100 shown in FIGS. 1-3B, and may be integral with the crate 201 sidewalls (therefore, the fishing rod holders 100' do not include mounting bosses). The crate portion 201 may be used to transport, for example, fishing bait and/or gear, fish catches, other boating equipment or supplies, or the like.

The fishing rod holder assembly 200 in this particular embodiment includes a bottom panel 222 that is releasably attachable to two opposing side panels 202 that include fishing rod holders 100' and is further releasably attachable to two opposing end panels 212. The end panels 212 also engage the side panels 202.

The side panels 202 in this embodiment each include a plurality of hook members 203 on a lower end of the side panels 202 that are configured to engage corresponding openings or receivers 223 in the bottom panel 222. The side panels 202 further include a plurality of receivers 218 on opposite ends that are configured to engage hook members 216 of the opposing end panels 212. The opposing end panels 212 each include hook members 214 that are configured to engage corresponding receivers 224 on opposite ends of the bottom panel 222. In this example, the bottom panels 222, end panels 212, and side panels 202 may be assembled to form the crate 200, including four fishing rod holders 100' disposed at each corner of the crate 200.

Optionally, the fishing rod holders 100' are co-formed portions of opposite side panels 202 of the fishing rod holder assembly 200, and the crate is a "break down crate" defined conventionally as a crate comprising a plurality of panels that can be assembled to form the crate and disassembled when not in use.

In other embodiments the crate may be configured to be broken down and reassembled and may include more or fewer than four fishing rod holders 100'.

While illustrative embodiments have been illustrated and described, it will be appreciated that various changes can be made therein without departing from the spirit and scope of the invention.

The embodiments of the invention in which exclusive property or privilege is claimed are defined as follows:

1. A fishing rod holder configured to receive and retain a handle end of a fishing rod, the fishing rod holder comprising:
   a tubular member comprising:
      an elongate channel portion having an upper end, a lower end, a front side, a back side, and an elongate slot opening inwardly into the elongate channel, the elongate slot extending downwardly from the upper end along the elongate channel portion toward the lower end;
      a collar portion that extends over at least an intermediate part of the front side of the elongate channel portion to cooperatively define a tube with the elongate channel portion; and
      an angled ramp that is fixed to the lower end of the elongate channel portion and slanted downwardly from the back side;
   wherein the tubular member is configured to receive the fishing rod such that the handle end slidably engages the angled ramp,
   wherein the fishing rod holder is configured to abut the fishing rod, simultaneously:
      at a point on the angled ramp;
      at a point on the collar portion nearer the upper end than the point on the angled ramp;
      at a point on the elongate channel portion nearer the upper end than the point on the collar portion when the handle end is received within the tubular member, and
   wherein the point on the collar portion nearer the upper end than the point on the angled ramp comprises a lower end of the collar portion that is configured to engage a portion of the fishing rod that is above the handle end when the fishing rod is received within the tubular member and extends at least partially within the elongate slot to engage the point on the elongate channel portion.

2. The fishing rod holder of claim 1, wherein the upper end of the elongate channel portion comprises a U-shaped lip that extends radially outward from the tubular member.

3. The fishing rod holder of claim 2, wherein the elongate channel portion further comprises at least two mounting bosses extending from the back side of the elongate channel portion.

4. The fishing rod holder of claim 3, wherein a back end of the U-shaped lip is aligned with, or forward of back ends of the at least two mounting bosses.

5. The fishing rod holder of claim 2, wherein the point on the elongate channel portion nearer the upper end than the point on the collar portion is at the U-shaped lip and the fishing rod is configured to engage the U-shaped lip when the handle end is received within the tubular member and extends at least partially within the elongate slot.

6. The fishing rod holder of claim 1, wherein the angled ramp further comprises a rim portion.

7. The fishing rod holder of claim 6, wherein the angled ramp and rim portion cooperatively define a drain.

8. The fishing rod holder of claim 1, wherein the collar portion defines a tapered slot that extends downwardly from a top end of the collar portion.

9. The fishing rod holder of claim 1, wherein the fishing rod holder is an integral portion of a first wall of a container.

10. The fishing rod holder of claim 9, wherein the container comprises at least four walls and a bottom panel, wherein the four walls and the bottom panel are configured to be assembled to form a crate.

11. A fishing rod holder configured to retain a fishing rod, the fishing rod holder comprising:
   an elongate tube configured to receive a handle end of the fishing rod therethrough, the elongate tube comprising:
      an upper abutment surface on a back side of the tube;
      a lower abutment surface on a front side of the tube opposite the back side; and
      an elongate slot opening inwardly into the elongate tube and extending downwardly from an upper end of the elongate tube along the back side; and
   a ramp extending at an angle slanted downwardly from the back side of the tube at a lower end of the tube such that the ramp extends directly under the tube,
   wherein the ramp is configured to slidably engage the handle end of the fishing rod received therein such that a weight of the fishing rod causes the handle end to slide down the ramp such that the fishing rod engages, simultaneously:
      the ramp;
      the lower abutment surface at a second engagement point on the fishing rod positioned above a first engagement point of the handle end at the ramp; and
      the upper abutment surface at a third engagement point on the fishing rod positioned above the second engagement point of the fishing rod at the lower abutment surface, and
   wherein the elongate slot is configured to receive a portion of the fishing rod therein when the handle end is received within the tubular member and the third engagement point on the fishing rod engages the upper abutment surface.

12. The fishing rod holder of claim 11, wherein the fishing rod holder is injection molded as a unitary piece.

13. The fishing rod holder of claim 11, wherein the ramp further comprises a rim portion.

14. The fishing rod holder of claim 11, wherein the elongate tube further comprises at least two mounting bosses extending from the back side of the elongate tube.

15. The fishing rod holder of claim 11, wherein the upper end of the elongate tube further comprises a U-shaped lip that extends radially outward from the elongate tube at the back side.

16. The fishing rod holder of claim 15, wherein the third engagement point on the fishing rod is configured to engage the upper abutment surface which is at the U-shaped lip when the handle end is received within the tubular member and the fishing rod extends at least partially within the elongate slot.

17. A crate assembly with a plurality of fishing rod holders, the crate assembly comprising:
   a bottom panel;
   two end panels attachable to the bottom panel so as to extend upwardly from the bottom panel;
   two side panels attachable to the bottom panel so as to extend upwardly from the bottom panel, each of the side panels being further attachable to each of the two end panels to form the crate assembly;
   wherein each of the side panels further comprises at least one of the fishing rod holder of claim 1.

18. The crate assembly of claim 17, wherein the at least one fishing rod holder of claim 1 of each of the side panels is an integrally formed portion of each of the side panels.

19. The crate assembly of claim 10, wherein the at least one fishing rod holder of claim 1 of each of the side panels further comprises more than one of the at least one fishing rod holder of claim 1.

* * * * *